(12) United States Patent
Walsh

(10) Patent No.: US 8,407,504 B2
(45) Date of Patent: Mar. 26, 2013

(54) SYSTEMS AND METHODS FOR IMPLEMENTING REDUCED POWER STATES

(75) Inventor: Jim Walsh, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 215 days.

(21) Appl. No.: 12/828,221

(22) Filed: Jun. 30, 2010

(65) Prior Publication Data

US 2012/0005506 A1   Jan. 5, 2012

(51) Int. Cl.
    *G06F 1/32* (2006.01)
(52) U.S. Cl. .................. 713/322; 713/324; 713/330
(58) Field of Classification Search .................. 713/323
    See application file for complete search history.

(56) References Cited

U.S. PATENT DOCUMENTS

| | | | |
|---|---|---|---|
| 7,325,733 B2 | 2/2008 | Wurzburg et al. | |
| 7,607,029 B2* | 10/2009 | Tseng et al. | 713/300 |
| 7,647,517 B2* | 1/2010 | Tseng et al. | 713/320 |
| 7,721,031 B2* | 5/2010 | Tseng et al. | 710/105 |
| 7,743,269 B2* | 6/2010 | Marks et al. | 713/323 |
| 7,809,969 B2* | 10/2010 | Das Sharma et al. | 713/324 |
| 7,849,340 B2* | 12/2010 | Tseng et al. | 713/323 |
| 7,984,314 B2* | 7/2011 | Cooper et al. | 713/323 |
| 2006/0149977 A1 | 7/2006 | Cooper | |
| 2006/0265611 A1* | 11/2006 | Wang et al. | 713/300 |
| 2006/0265612 A1* | 11/2006 | Tseng et al. | 713/300 |
| 2006/0271651 A1* | 11/2006 | Tseng et al. | 709/220 |
| 2008/0209246 A1* | 8/2008 | Marks et al. | 713/323 |
| 2008/0288798 A1* | 11/2008 | Cooper et al. | 713/322 |
| 2009/0327774 A1* | 12/2009 | Jeyaseelan et al. | 713/320 |
| 2010/0115311 A1* | 5/2010 | Tseng et al. | 713/320 |
| 2010/0169685 A1* | 7/2010 | Gough et al. | 713/323 |
| 2011/0233999 A1* | 9/2011 | Browning | 307/31 |
| 2011/0249022 A1* | 10/2011 | Poornachandran et al. | 345/619 |
| 2011/0296222 A1* | 12/2011 | Tan et al. | 713/324 |
| 2011/0320835 A1* | 12/2011 | Browning | 713/320 |

FOREIGN PATENT DOCUMENTS

| | | | |
|---|---|---|---|
| WO | 2012/012144 A2 | 1/2012 | |
| WO | 2012/012144 A3 | 10/2012 | |

OTHER PUBLICATIONS

"PCI-SIG Engineering Change Notice"; PCI-SIG; Aug. 23, 2012; all pages.*
International Search Report and Written Opinion for PCT Application No. PCT/US2011/042230, mailed on Jul. 31, 2012, 10 pages.

* cited by examiner

*Primary Examiner* — Ryan Stiglic
(74) *Attorney, Agent, or Firm* — Erik R. Nordstrom

(57) ABSTRACT

In some embodiments, provided is a way for devices to request S0ix (or the like) entry and exit.

10 Claims, 1 Drawing Sheet

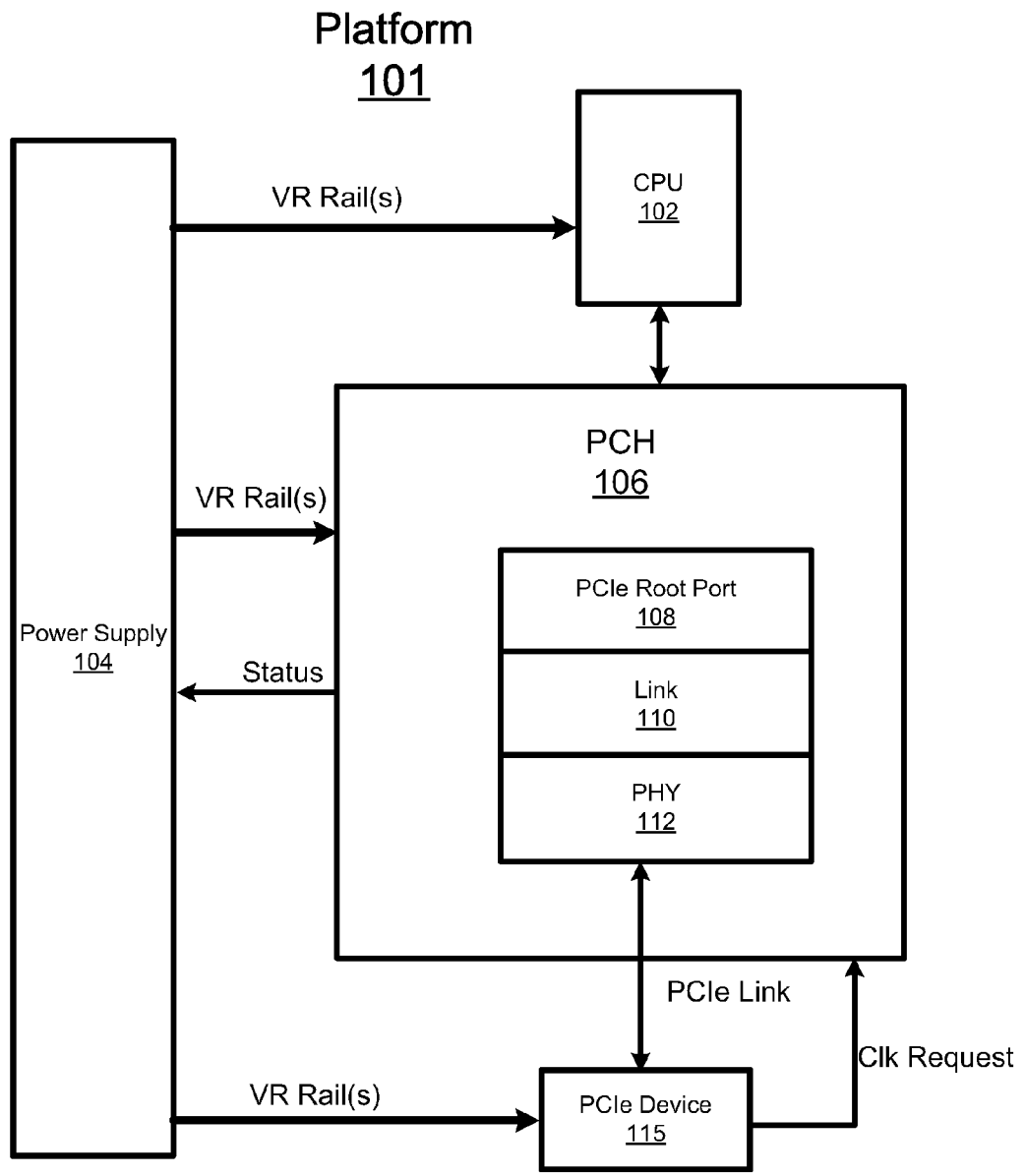

SYSTEMS AND METHODS FOR IMPLEMENTING REDUCED POWER STATES

TECHNICAL FIELD

The present invention relates generally to reduced power states in computing platforms.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1 is a diagram of a portion of a system having a port with efficient power reduction state entry in accordance with some embodiments.

DETAILED DESCRIPTION

Computing platforms (platform hardware in combination with an operating system such as Windows™) can normally enter lower power states. For example, so-called "S" states (S0, S3, S4, and S5) states may be implemented with Windows™ and other operating systems, along with popular interfaces such as PCI Express and USB3.

In some systems, S0 may be the most active state, S3 may be a standby state, S4 may be a hibernate state, and S5 may be an off state. Within the most active state (S0), there may be further sub-states of differing activity for conserving power in the platform. One of these states may be referred to as an S0ix state. In this state, hardware components such as PCIe devices and the system controller and/or platform control portions can be in reduced power modes, even though the system is in the S0 (active) state.

S0ix entry and exit generally require coordination between a system controller, e.g., within a platform control block such as a platform controller hub ("PCH") and PCIe (Peripheral Component Interface Express) devices. With conventional technology, a device typically initiates S0ix exit (to enter a more active operational mode) by initiating an L1 (low power PCIe link state) exit. Unfortunately, this generally requires both the device's and the system controller, e.g., their PHY and Link layers to remain powered when in the S0 ix (reduced power) mode, and for the system controller to be monitoring for L1 exit initiation by the device. That is, even though a PCIe link between a device and port may be idle, both partners may need to remain powered, at least to some degree, in case link activity is to occur.

Accordingly, in some embodiments, provided is a way for devices to request S0ix (or the like) entry and exit without some of the drawbacks of prior art solutions. For example, in some embodiments, it may allow a system controller to remove much (if not all) power from the PCIe Physical and Link layer circuitry during S0ix. In some embodiments, it may allow devices (e.g., PCIe devices) to remove most (if not all) power from its Physical and Link layer circuitry during an S0ix state. In some embodiments, it may allow the system power supply to be placed in a lower power state during S0ix under suitable conditions.

FIG. 1 generally shows a portion of a computing platform 101 such as a portable computer, desktop or server computer, tablet, netbook, smart phone, etc. It comprises a CPU (central processing unit) chip 102, a power supply 104, and a system (or platform) control block 106. In some embodiments, the platform control block 106 may be implemented with a platform controller hub (PCH), which for convenience, will be used for reference to a platform control block in general. (Note that the CPU and PCH could correspond to separate chips or to functional blocks in a chip such as a system-on-chip (SOC) or other highly integrated computing chip.)

The PCH 106 comprises one or more PCIe ports 108 with associated link and PHY layers, 110, 112, respectively. The port 108 is made to be coupled with a corresponding PCI device 114 (such as a wireless network card, Ethernet card, USB bridge, etc.). When coupled together through their respective interfaces, they may form an active PCIe link and communicate with one another. (Note that the PCH 106 may comprise other ports and controllers such as audio ports, USB ports, hard-drive controllers, platform power controllers, and the like. Also, a single PCIe device is shown for simplicity but multiple devices could be coupled to multiple ports within the PCH.)

While not all interface signals are shown, besides link signals (e.g., transmit and receive lanes that may make up the referenced "PCIe link"), their interfaces may also include a clock request (Clk Request) signal. In some embodiments, the Clk Request signal may be asserted by a system controller (e.g., in the PCH) or the device so that either link partner can inform the other that it needs to make a communication. For example, it may use wire-OR signaling. A device 114 uses this Clk Request signal to request a reference clock (not shown) from the port so that it may communicate with the port. With conventional systems, the Clk Request signal is normally only used to make this reference clock activation request, but with some embodiments disclosed herein, it is also used to indicate whether or not the device can enter, desires to, or will enter into a less active (e.g., S0ix) state. In some embodiments, this can allow the device to reduce power from its link and PHY layer circuitry, and it can also allow the system controller to reduce (e.g., remove) power in the PCH port's corresponding link and PHY layers.

When the Clk Request signal is assertable by the system controller (system) or the device, the system may assert it to inform the device that the system is not in S0ix and may initiate access with the device. So when a device is in an inactive state, either or both the system link/PHY and device link/PHY circuitry may be powered down. On its own initiative, the PCIe device may enter a reduced power state by de-asserting Clk Request and then asserting Clk Request when it needs to come out of the reduced power mode (e.g., to send a PCIe transmission, which may require the system to re-power the corresponding PCIe port/link/PHY circuitry, as well as provide power (or more power) to the device.)

In some embodiments, the PCH system controller may disallow the PCH to enter the S0ix state while any device is active (i.e., if any Clk Request signal from any PCIe device is asserted). The system may also prevent a system level S0ix state or initiate S0ix exit if other PCH functions are to be active. The system may use the transition to the asserted state (exiting out of S0ix state) to cause power to be reapplied to the port's PHY and Link layer circuitry 110, 112. Once the power is reapplied, the state of the system controller's PHY and Link layers is restored, and, for example, a normal L1 exit process may be initiated.

Thus, in some embodiments, for the system to be in the S0ix state, a sufficient number (e.g., some or all) of its ports, controllers, etc. should be in a lower power (e.g., S0ix) state. Once the system is in an S0ix state, the system power supply (power rails from the power supply to the PCH) may be placed in a lower power state by applying an appropriate status signal, e.g., by asserting a VR Idle Enable signal. If the device (or any other device) wishes to become active, it may assert Clk Request, which then results in the system re-asserting the power supply, not only to the system, but also to the device(s) that are to become active (if the system controls power to the device(s)). In some embodiments, a device may include circuitry so that it waits a specified amount of time after Clk Request assertion to fully activate itself in order to give the power supply and PCH sufficient time, e.g., to avoid power droops, transients, etc. In other schemes, for example, it could wait until it perceives the reference clock from the PCH after asserting the Clk Request signal. Note that when an individual device is powered down (its Clk Request de-asserted), the system may otherwise inform the power supply, so that it is able to provide sufficient power when needed, i.e., to reduce transients and the like.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The term "PMOS transistor" refers to a P-type metal oxide semiconductor field effect transistor. Likewise, "NMOS transistor" refers to an N-type metal oxide semiconductor field effect transistor. It should be appreciated that whenever the terms: "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs, material types, insulator thicknesses, gate(s) configurations, to mention just a few. Moreover, unless specifically referred to as MOS or the like, the term transistor can include other suitable transistor types, e.g., junction-field-effect transistors, bipolar-junction transistors, metal semiconductor FETs, and various types of three dimensional transistors, MOS or otherwise, known today or not yet developed.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A chip, comprising:
a port to communicate with a corresponding device, the port having a clock request node for the device to assert when entering a reduced power mode, wherein the clock request node is assertable by the port and the device.

2. The chip of claim 1, in which the port is a PCI Express port.

3. The chip of claim 1, in which the clock request node when asserted is to cause a reference clock to be provided to the device.

4. The chip of claim 1, comprising a system controller to enter itself into a reduced power mode if a number of functions including the device is to be in the reduced power mode.

5. The chip of claim 1, in which the reduced power mode is an S0ix state.

6. A computing platform, comprising:
a CPU;
a power supply; and
a platform controller hub comprising a system controller and at least one port to communicate with a device, the port having a clock request node for the device to assert when entering a reduced power mode, the system controller to reduce power supplied to link and PHY circuitry for the port when the node is de-asserted, wherein the clock request node is assertable by both the system controller and the device.

7. The platform of claim 6, in which the port is a PCI Express port.

8. The platform of claim 6, in which the clock request node when asserted is to cause a reference clock to be provided to the device.

9. The platform of claim 6, wherein the system controller is to enter into a reduced power mode if a number of functions including the device is to be in the reduced power mode.

10. The platform of claim 6, in which the reduced power mode is an S0ix state.

* * * * *